United States Patent [19]

Geist et al.

[11] Patent Number: 4,724,254

[45] Date of Patent: Feb. 9, 1988

[54] WATER DISPERSIBLE BINDERS FOR CATIONIC ELECTRA-COATING AND METHOD FOR PREPARATION

[75] Inventors: Michael Geist, Münster; Günther Ott, Münster-Wolbeck; Georg Schön, Everswinkel, all of Fed. Rep. of Germany

[73] Assignee: BASF Farben & Fasern AG, Hamburg, Fed. Rep. of Germany

[21] Appl. No.: 23,977

[22] Filed: Mar. 10, 1987

Related U.S. Application Data

[63] Continuation of Ser. No. 568,627, Jan. 6, 1984, abandoned.

[30] Foreign Application Priority Data

Jan. 10, 1983 [DE] Fed. Rep. of Germany ....... 3300570

[51] Int. Cl.$^4$ ..................... C08G 59/06; C08G 59/18
[52] U.S. Cl. .................... 525/523; 525/415; 525/533; 525/411; 528/109; 528/110; 528/111; 528/112
[58] Field of Search ............... 525/523, 533, 415, 411; 528/110, 111, 112, 109

[56] References Cited

U.S. PATENT DOCUMENTS

| | | | |
|---|---|---|---|
| 3,985,695 | 10/1976 | Tobias et al. | 525/533 |
| 4,081,492 | 3/1978 | Traeckner et al. | 525/523 |
| 4,148,772 | 4/1979 | Marchetti et al. | 525/523 |
| 4,373,059 | 2/1983 | Patzschke et al. | 525/533 |
| 4,436,878 | 3/1984 | Batzill et al. | 525/528 |

*Primary Examiner*—Lewis T. Jacobs
*Assistant Examiner*—Robert E. L. Sellers, II
*Attorney, Agent, or Firm*—Kenyon & Kenyon

[57] ABSTRACT

The invention relates to water-dispersible binding agents for cationic electro-immersion varnishes on the basis of modified epoxy resins. The binding agents are reaction products of (A) low-molecular epoxy resins containing aromatic groups, with an equivalent epoxy weight of less than 375, (B) aliphatic and/or alicyclic polyfunctional alcohols and/or carboxylic acids with a molecular weight less than 350, where the intermediate product obtained from (A) and (B) has a content of aromatic groups of 10 to 45%, calculated as a phenylene group, (C) polyfunctional alcohols, carboxylic acids and/or SH-compounds with a molecular weight of 500 to 5000, and (D) amino alcohols with at least one concealed primary or a tertiary nitrogen atom.

19 Claims, No Drawings

WATER DISPERSIBLE BINDERS FOR CATIONIC ELECTRA-COATING AND METHOD FOR PREPARATION

This application is a continuation of application Ser. No. 568,627 filed Jan. 6, 1984, now abandoned.

The invention relates to water-dispersible binding agents for cationic electro-immersion varnishes on the basis of modified epoxy resins.

Synthetic cationic water-dispersible resins are known as binding agents for electro-immersion varnishes. Thus, for instance, DE-OS No. 2 701 002 describes such a resin which is a reaction product of a polyepoxy with a molecular weight of at least 350, a secondary amine and an organic polyol with at least two alcoholic primary hydroxyl groups. The resins are produced by chain extension of high-molecular polyepoxies with at least 2 epoxy groups per molecule. The chain extension is achieved by an organic polyol and the water-dispersibility is obtained by the addition of a secondary amine.

This and other known synthetic resins for cathodic electro-immersion varnishing are frequently used for priming, i.e., the articles coated therewith are given an additional cover varnish layer. It is a disadvantage that only coatings with a relatively small layer thickness can be obtained with the resins known to date. Thus, layers of only 11.4 to 18 μm are given as attainable in DE-OS No. 2 701 002.

If especially stringent requirements are specified for a varnish as to corrosion resistance and surface quality, such as is the case, for instance, in varnishing motor vehicles and other high-value products, it has therefore been customary to date to apply a so-called filler as an additional layer between the electro-immersion primer and the cover varnish. This is complicated and cost-intensive. It is therefore desirable to improve the electro-immersion varnishing method so that greater layer thicknesses can be obtained with this method. This, however, is not possible with the cationic synthetic resins known to date, as already explained above. The problems arise from the fact that upon increasing the deposition voltage beyond the breakdown voltage, surface disturbances occur in the film by cracking of the layer. Extending the coating time likewise results in an increase in the layer thickness, but this increase cannot be continued arbitrarily, since normally, due to the electric resistance of the deposited film, an upper limit for the layer thickness exists, at which practically no further increase of the layer thickness occurs, no matter how long the coating is continued.

Surprisingly, it has now been found that in electro-immersion varnishing, larger layer thicknesses can be obtained if binding agents on the basis of modified epoxy resins are used which contain aromatic and aliphatic or alicyclic groups in certain ratios.

It is therefore an object of the invention to describe water-dispersible binding agents for cationic electro-immersion varnishes which allow, if used, to obtain larger layer thicknesses.

According to the invention, this problem is solved in binding agents of the type mentioned at the outset by the provision that they are reaction products of (A) low-molecular epoxy resins containing aromatic groups with an equivalent epoxy weight of less than 375, (B) aliphatic and/or alicyclic polyfunctional alcohols and/or carboxylic acids with a molecular weight of less than 350, where the intermediate product obtained from (A) and (B) has an aromatic group content of 10 to 45%, calculated as a phenylene group, (C) polyfunctional alcohols, carboxylic acids and/or SH-compounds with a molecular weight of 500 to 5000 and (D) aminoalcohols with at least one blocked primary or a tertiary nitrogen atom.

For component A (low-molecular epoxy resins containing aromatic groups with an equivalent epoxy weight of less than 375), polyepoxies are suited. In the present invention, materials can be used as polyepoxies which contain two or more epoxy groups in the molecule. Preferred are compounds with two epoxy groups per molecule. The polyepoxies have a relatively low molecular weight of at most 750 and preferably, 400 to 500. The polyepoxies can be, for instance, polyglycidyl ethers of polyphenols, such as bisphenols and advantageously, for instance, bisphenol A. These polyepoxies can be prepared by etherification of a polyphenol with an epihalohydrin in the presence of alkali. Examples for suitable phenol compounds are bis(4-hydroxyphenyl)-2,2-propane, 4,4'-dihydroxybenzophenone, bis(4-hydroxyphenyl)-1,1-ethane, bis(4-hydroxyphenyl)-1,1-isobutane, bis(4-hydroxy-tertiary-butyl-phenyl)-2,2-propane, bis(2-hydroxynaphthylmethane, 1,5-dihydroxynaphthalin and hydantoin epoxies.

Another suitable class of polyepoxies are polyglycidyl ethers of phenolic novolak resins.

Polyglycidyl esters of aromatic polycarboxylic acids can also be used to advantage.

As the component B, aliphatic and/or alicyclic polyfunctional alcohols or carboxylic acids with a molecular weight of less than 350 are used. These have advantageously a branched aliphatic chain, especially with at least one neostructure.

Suitable compounds correspond to the following general formula:

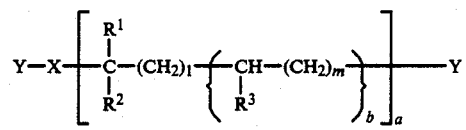

Y = OH, COOH
X = (CH$_2$)$_n$
where

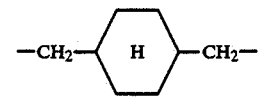

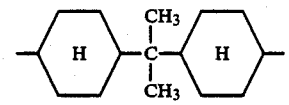

R$^1$, R$^2$, R$^3$=H, alkyl radical with 1 to 5 C-atoms,
a=0;1
b=0;1
l=0 to 10
m,n=1 to 10.

As examples will be mentioned: Diols such as ethylene glycol, diglycol, dipropylene glycol, dibutylene glycol, triglycol, 1,2-propane diol, 1,3 propane diol, 2,2-dimethyl-1,3-propane diol, 2,2-diethyl-1,3-propane diol, 2-methyl-2-ethyl-1,3-propane diol, 2-methyl-2-propyl-1,3-propane diol. 2ethyl-2-butyl-1,3-propane diol, 1,2-butane diol, 1,4-butane diol, 2,3-butane diol, 2-ethyl-1,4-butane diol, 2,2-diethyl-1,3-butane diol, butene-2-diol-1,4, 1,2-pentane diol, 1,5-pentane diol, 3-methyl-1,5-pentane diol, 1,6-hexane diol, 2,5-hexane diol, 2-ethyl-1,3-hexane diol, 2,5-dimethyl-2.5-hexane diol, 1,3-octane diol, 4,5-nonane diol, 2,10-decane diol, 2-hydroxyethylhydroxy acetate, 2,2-dimethyl-3-hydroxypropyl-2,2-dimethylhydroxy propionate, 2-methyl-2-propyl-3-hydroxy-propyl-2-methyl-2 propylhydroxy propionate, 4,4'-methylenebis cyclohexane and 4,4'-isopropylidene biscyclohexanol. Some preferred diols are 2,2-dimethyl-1,3-propane diol, 3-methyl-1,5-pentane diol, 2,2-dimethyl-3-hydroxypropyl hydroxypropionate and 4,4'-isopropylidene biscyclohexanol.

As carboxylic acids can be considered a large number of dicarboxylic acids such as oxalic acid, malonic acid, 2,2-dimethyl malonic acid, succinic acid, glutaric acid, adipinic acid, hexhydrophthalic acid, maleic acid, fumaric acid, pimelic acid, suberic acid, azelainic acid, sebacic acid, itaconic acid, citraconic acid, mesaconic acid and glutaconic acid.

Preferably used dicarboxylic acids are, for instance, 2,2-dimethylmalonic acid and hexahydrophthalic acid.

It is essential that the compounds of component B are reacted with component A in such a ratio that the reaction product has the indicated content of aromatic groups of 10 to 45%, calculated as a phenylene group.

For preparing the reaction product, also component C is used. Its content in the total binding agent is advantageously 10 to 50 percent by weight.

The polyfunctional alcohols, carboxylic acids and SH-compounds suitable as the component C have a molecular weight of 500 to 5000 and preferably, of 530 to 3000. The polyols considered for the invention include diols and polymeric polyols such as polyester polyols and polyether polyols. Especially preferred are polyester polyols and among them, polycaprolactone polyols.

Polyalkylene ether polyols suitable for component C correspond to the following formula:

where R=hydrogen or a low alkyl radical, optionally with different substituents; n=2 to 6 and m=10 to 50 or even higher.

Examples are poly(oxytetramethylene)glycols and poly(oxyethylene)glycols.

The preferred polyalkylene ester polyols are poly(oxytetramethylene)glycols with a molecular weight in the range of 500 to 2000.

The polyester polyols can also be used as polymeric polyol component (component C) in the invention. The polyester polyols can be prepared by polyesterification of organic polycarboxylic acids or their anhydrides with organic polyols which contain primary hydroxyl groups. Customarily, the polycarboxylic acids and the polyols are aliphatic or aromatic dicarboxylic acids and diols.

In the invention, also polyester polyols which are derived from lactones can be used as component C. These products are obtained, for instance, by reaction of an ε-caprolactone with a polyol. Such products are described in U.S. Pat. No. 3,169,945.

The polylactone polyols which are obtained by this reaction are characterized by the presence of an end-position hydroxyl group and by recurring polyester components which are derived from the lactone. These recurring molecule shares can correspond to the formula

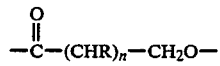

in which n is at least 4 and preferably 4 to 6 and the substituent is hydrogen, an alkyl radical, a cycloalkyl radical or an alkoxy radical, no substituent containing more that 12 carbon atoms, and where the total number of carbon atoms in the substituents in the lactone ring does not exceed 12.

Polyurethanes are another class of resins or polymers which can be used as component C. As is well known, the polyurethanes are polyadducts of polyisocyanates and a compound with at least two reactable hydrogen atoms, i.e., hydrogen atoms which can be detected by the Zerowitinoff method.

As polyfunctional SH-compounds (component C) can be considered reaction products of organic dihalogenides with sodium polysulfide. Other SH-compounds are, for instance, reaction products of hydroxyl-group-containing linear polyesters, polyethers or polyurethanes with mercapto carboxylic acids such as mercapto acetic acid, 2-mercapto propionic acid, 3-mercapto propionic acid, mercapto butyric acid and similar compounds.

For the amino alcohols which are used as component (D) and comprise a blocked primary amine or a tertiary amine, are suited particularly di- and tri-alkanol amines which correspond to the general structure formula

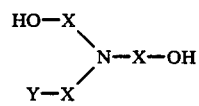

X=alkylene, branched unsaturated or cycloaliphatic alkylene, arylene
Y=OH, H

Examples for this are methyldiethanolamine, butyldiethanolamine, methyldiisopropanolamine, cyclohexyldiisopropanolamine, triethanolamine and triisopropanolamine.

Other suitable amino alcohols are amino alkanols, diamino alkanols and polyamino alkanols which may correspond, for instance, to the following structure formula:

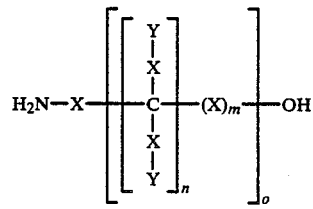

X=alkylene, branched unsaturated or cycloaliphatic alkylene, arylene or heteroatom.
Y=H, NH$_2$
n=0 to 5
m=0 to 5
O=0 to 3.

Examples for this are monoethanolamine, 2-(2-aminoethoxy)-ethanol, 2-aminobutanol-1, neopentylamine.

For the reaction are also suitable (N,N-alkylaminoalkyl)alkanolamines and (N,N-diaminoalkyl)alkanolamines which correspond to the general structure formula

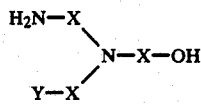

X=alkylene, branched unsaturated or cycloaliphatic alkylene, arylene
Y=NH$_2$, H Examples for this are (N,N-methyl-hydroxymethyl)-propanediamine-1,3,N,N,N-2-aminoethyl-3-aminopropyl-2-hydroxyethylamine, N,N,N-di-2-aminoethyl-2-hydroxyethylamine.

The amino alcohols can be used individually or as a mixture.

If amino alcohols are reacted with primary amino groups, these amino groups must be blocked prior to being reacted with the epoxy groups, i.e., for instance, changed into ketimines. Ketimines are the reaction products of primary amino groups with ketones. The ketones suitable for this purpose correspond to the general structure formula

where R$_1$ and R$_2$ are organic radicals which are substantially inert vis-a-vis the ketimine compound. Preferably, R$_1$ and R$_2$ are short alkyl radicals (2 to 4 carbon atoms). It is frequently advantageous to use a ketone which boils near the boiling point of water or readily distills-over with water. The reaction of the ketone with the primary amine can be illustrated by the following formula:

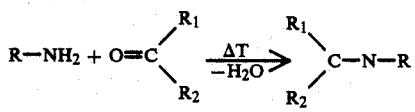

Preferred examples of ketones include acetone, methylethylketone, diethylketone, methylpropylketone, methylisopropylketone, methyl-n-butylketone, methylisobutylketone, ethylisopropylketone, cyclohexanone, cyclopentanone, acetophenone. Especially preferred ketones are acetone, methylethylketone and methylisobutylketone.

After the reaction, the product obtained should not be subjected to conditions, under which the ketimine group is decomposed, forming a free amine group, as long as the possibility of gelling or cross-linking by primary amino groups exists. The ketimine is decomposed in the dispersion in water.

Acids suitable for neutralizing the amines, which can be used with the invention, include boric acid or other acids with a dissociation constant larger than boric acid, preferably organic acids with a dissociation constant larger than about $1 \times 10^{-5}$. The preferred acid is acetic acid. Examples of other suitable acids are formic acid, lactic acid, propionic acid, butyric acid, hydrochloric acid, phosphoric acid, sulfuric acid and carbon dioxide.

To obtain highly resistant coatings using the binding agents according to the invention, it is advantageous to add to the electro-immersion varnish a cross-linking agent which causes cross-linking of the binding agent at elevated temperatures, or to modify the binding agent in such a way that it contains reactive groups which cause self-cross-linking at elevated temperatures. A self-cross-linking system can advantageously be achieved by the provision that the binding agent is reacted with a gel-blocking polyisocyanate which has in the average one free isocyanate group per molecule and the blocked isocyanate groups which are stable at room temperature are unblocked at elevated temperatures and react with the hydroxyl groups produced by the opening of the epoxy rings, forming urethane.

Frequently used methods for cross-linking binding agents are made public in the following Offenlegungsschriften: DE-OS No. 2 057 799; European Patent Application Nos. 12 463 and 4090 and DE-OS No. 2 752 256.

If cross-linking agents are used, they amount as a rule to about 5 to 60% by weight of the binding agent. Preferred are about 20 to about 40% by weight of the binding agent.

Examples of suitable aminoplast cross-linking agents are the hexamethyl ether of hexamethylol melamine, the hexabutyl ether of hexamethylol melamine, and the hexamethylether of hexamethylolamine and polymeric butylated melamine formaldehyde resins.

Urea aldehyde cross-linking agents can be prepared in a manner known per se by reacting urea and an aldehyde up to the resol stage and alkylizing the reaction product with an alcohol under acid conditions, whereby an alkylated urea aldehyde resin is obtained. An example of a suitable cross-linking agent on the basis of a urea aldehyde resin is a butylated urea formaldehyde resin.

As cross-linking agents can also be used blocked polyisocyanates. In the invention, any polyisocyanates can be used, in which the isocyanate groups are reacted with a compound, so that the formed blocked polyisocyanate is stable against hydroxyl groups at room temperature, but reacts as a rule in the range from about 90° to about 300° C. In the preparation of the blocked polyisocyanates, any organic polyisocyanates suitable for the cross-linking can be used.

The invention also relates to a method for preparing the binding agents which is characterized by the features that (A) low-molecular epoxy resins containing aromatic groups with an equivalent epoxy weight of less than 375 are reacted with (B) aliphatic and/or alicyclic polyfunctional alcohols or carboxylic acids with a molecular weight of less than 350, with addition to the epoxy group in such a way that the reaction products contain a share of aromatic groups of 10 to 45%, calculated as a phenylene group, and these reaction products are further modified (C) by polyfunctional alcohols, carboxylic acids and/or SH-compounds with a molecular weight of 500 to 5000 as well as to obtain the required water dispersibility, by (D) amino alcohols, where the amino alcohol contains at least one blocked primary or a tertiary nitrogen atom.

The method is carried out as follows: Component A and component B are mixed and are reacted completely, optionally with the addition of catalysts such as tertiary amines, at temperatures between 100° and 140° C. and preferably 115° to 135° C. The reaction can be checked by means of the equivalent epoxy weight. This reaction product of the components A and B can optionally be modified further by the component C at temperatures between 100° and 140° C. Also this reaction can be controlled by means of the equivalent epoxy weight.

The so obtained reaction product still contains free epoxy groups. For this reaction step, the same catalysts can be used as in the reaction of the components A and B. The reaction product obtained in this way is reacted with the component D at temperatures between 90° and 120° C., so that a binding agent is produced which contains basic amino groups. The basic reaction product can be protonized completely or partially by the addition of acids and subsequently dispersed in water. The cross-linking agent can be admixed to the binding agent prior to the dispersion in water or, depending on the reactivity, be fed-in during the preparation of the binding agent. The binding agents obtained are stable dispersions which are easy to handle. Optionally, it may also be advantageous to dissolve the binding agents in suitable organic solvents before the dispersion is made. Suitable solvents are, for instance, glycol ether, ethylglycol, butyl-glycol, ketones such as ethyldiethyl ketone, methylethyl ketone, methylisobutyl ketone and others.

The invention further relates to the use of the binding agents for electro-immersion baths.

The electro-immersion baths may contain customary pigments. Frequently, a dispersion agent or a surface-active agent is added to the pigments. The pigment and the optionally used surface-active agent are milled together in part of the binding agent or alone to prepare a paste which is blended with the remaining binding agent for producing the coating compound.

In some cases it is advantageous to add to the electro-immersion bath a not-ionic modification agent or solvent, to improve the dispersibility, the viscosity and/or the film quality. Examples of such materials are aliphatic, naphthenic and aromatic hydrocarbons or mixtures thereof; mono- and dialkyl ethers of glycols, Siberian pine needle oil and other solvents which are compatible with the resin system. The presently used modification agent is 4-methoxy-4-methylpentanone-2.

To the electro-immersion bath can further be added other additions such as antioxidation agents. Examples for this are orthoamylphenol or cresol. The addition of such antioxidation agents is desirable particularly if the deposition baths are exposed to atmospheric oxygen at elevated temperatures for extended periods of time, while stirring.

Other additives which the bath may optionally contain are wetting agents such as raw oil sulfonates, sulfatized fatty amines or their amides, alkylphenoxypolyethylene alkanols or phosphate esters, including ethoxilated alkylphenol phosphates. Other groups of possible additives are antifoaming agents and suspension agents. Normal tap water can be used for forming the deposition bath. Since however such water contains relatively large salt contents, undesirable changes in the electro-deposition can occur thereby. Therefore, deionized water is generally preferred.

The above-mentioned possible additives are not exhaustive, since any other additives which do not interfere with the electric deposition, can be used.

The invention further relates to a method for the electrophoretic coating of an electrically conducting substrate connected as a cathode from an aqueous bath on the basis of a cationic binding agent which is neutralized at least partially neutralized by acids, where the binding agents were made self-cross-linkable by reaction, or the bath contains an additional cross-linking agent which is characterized by the feature that the binding agents are reaction products of (A) low-molecular epoxy resins containing aromatic groups, with an equivalent epoxy weight of less than 375, (B) aliphatic and/or alicyclic polyfunctional alcohols and/or carboxylic acids with a molecular weight of less than 350, where the intermediate product obtained from (A) and (B) has a content of aromatic groups of 10 to 45%, calculated as phenylene groups; of polyfunctional alcohols, carboxylic acids and/or SH-compounds with a molecular weight of 500 and 5000, and (C) amino alcohols with at least one blocked primary or a tertiary nitrogen atom.

In the electrical deposition, any electrically conducting substrate can serve as the substrate. Customarily, these are metal substrates such as iron, steel, copper, zinc, brass, tin, nickel, chromium and aluminum as well as other metals, pre-treated metals, and furthermore phosphatized or chromatized metals. Also impregnated paper and other conducting substrates can be used.

In cationic deposition, the articles to be coated are immersed in an aqueous dispersion of the solubilized, film-forming cationic binding agent. An electric voltage is applied between the object to be coated, which serves as the cathode, and an anode, and the cationic binding agent is deposited by the electric current on the cathode. The article is then removed from the bath and as a rule, rinsed. Then, the coating is hardened in the usual manner by heat.

The invention will be explained in further detail by the following examples. All data on parts and percentages are by weight, unless expressly stated otherwise.

EXAMPLE 1

Preparation of Binding Agent I 1002 parts of a commercially available epoxy resin of the bisphenol A type (equivalent epoxy weight 188), 139 parts neopentylglycol and 39 parts xylol are placed in a 4-liter reactor and heated. At 122° C., 4 parts dimethylbenzylamine are added. Due to the setting-in exothermic reaction, the temperature rises to 133° C. This temperature is held until an equivalent epoxy weight of 425 is reached. Then, 378 parts of a 95% solution of a polycaprolactone polyol (OH number, 208.5) in xylol and 3 parts dimethylbenzylamine are added. The reaction is continued at 133° C. until an equivalent epoxy weight of 1073 is reached. Then, 294 parts of a reaction product of isopropanolamine and excess methylisobutyl ketone (amino equivalent of the ketimine 223) are added. The reaction is continued for 3.5 hours at 133° C. and then, 166 parts hexylglycol and 1.208 parts of the cross-linking agent I (hereinafter described) are added.

In the meantime, a dispersion bath is prepared from 1,817 parts of distilled water, 37 parts glacial acetic acid and 50 parts of an emulsifier solution. The acid number of the bath is 19.1. Into this bath, 2,600 parts of the above-described resin solution are then stirred. After one hour, another 1189 parts distilled water are added, which are mixed-in for 15 minutes. Then the dispersion is filtered. The dispersion has the following characteristics:

Solids: 34.7% MEQ base: 0.539
pH-value: 7.05 MEQ acid: 0.375
THF solubility clear

EXAMPLE 2

Preparation of Binding Agent 2

1074 parts of a commercially available epoxy resin of the bisphenol A type (equivalent epoxy weight 188), 149 parts neopentyl glycol and 42 parts xylol are placed in a 4-liter reactor and heated to 130° C. At 125° C., 4 parts dimethylbenzylamine are added. The reaction is held at 130° C. until an epoxy equivalent weight of 428 is reached. Then, 404 parts of a 95% solution of a polycaprolactone polyol (OH number 208.5) and another 3 parts dimethylbenzylamine are added. The reaction is continued at the temperature given until an equivalent epoxy weight of 1051 is reached. Then, 316 parts of a reaction product of isopropanolamine and excess methylisobutyl ketone (amine equivalent 223) are added. The reaction is continued for 4 hours. Then, 1283 parts of the cross-linking agent II, 177 parts hexyl glycol and 3% by weight lead octoate (referred to the solid) are mixed in.

In the meantime, a dispersion bath of 1857 parts deionized water, 37.9 parts glacial acetic acid and 51 parts of an emulsifier solution is prepared. The bath pH value is 18.9. Into this bath are then stirred 2700 parts of the resin solution as prepared in the preceeding paragraph. After one hour, another 1208 parts deionized water and after another 20 minutes 500 parts deionized water are added. Subsequently, the dispersion is filtered. The dispersion has the following characteristics:

Solids: 31.8% MEQ acid: 0.532
pH value: 7.3 MEQ base: 0.619

Preparation of a Pigment Paste 146 g of a reaction product of an epoxy resin with an equivalent epoxy weight of 890 and dietholamine-lactic acid salt are distilled with 199 g of deionized water. To this are added 200 g TiO₂, 48 g extender of the aluminum silicate type, 11 g lead silicate and 3 g carbon black. The starting components are comminuted in a milling set to a Hegman fineness of 5 to 7. Then, another 102 g deionized water are added to reach the desired paste consistency. The grey pigment paste is very stable in storage.

Preparation of a Cross-Linking Agent I

A reactor which is equipped with a heating device, a cooler, a stirrer, a thermometer, an output line which leads to a washing device, and a device for introducing nitrogen, is charged with 12,280 parts toluyelene diisocyanate (mixture of about 80% 2,4-toluylene diisocyanate and about 20% 2,6-toluylene diisocyanate). Nitrogen is admitted and the cooler is switched on. In the course of 5 hours, 5,550.5 parts 2-ethylhexanol are gradually added, while the temperature slowly rises to 50° C. While the temperature of 50° C. is being maintained, another 3,649.5 parts 2-ethylhexanol are added in the course of 4 hours. The reaction mixture is held at 50° C. for 75 minutes; then the cooler is switched off and 3.6 parts dibutyl tin dilaurate are added. The heating device is switched on and the reaction mixture is warmed up to 65.6° C. in the course of 45 minutes. In the course of two hours and 50 minutes, 3,184 parts 1,1,1-trimethylol propane are added, while the temperature rises from 65.6° to 120° C. The reaction mixture is held at this temperature for 90 minutes; then, 10,560 parts 2-ethoxy ethanol are added.

The product obtained is a solution of polyurethane cross-linking agent.

Preparation of a Cross-Linking Agent II 2,340 g glycidyl ester of 2-methyl-2-ethyl heptane acid are heated with 2,073 g trimellitic acid anhydride in a reaction vessel heated to 130° C. In the process, the heavily exothermic reaction starts. The reaction is kept at 150° C. by external cooling until an acid number of 183 is reached. Thereupon, cooling to 90° C. takes place and 1,450 g MIBK (methylisobutyl ketone) are added. Subsequently, 835 g propylene oxide are slowly added dropwise. At an acid number of 2, the reaction is broken off. The solids of the resin solution is adjusted to 70% with additional MIBK.

Preparation of the Electro-Immersion Bath I 2000 parts deionized water and 25 parts of 10% acetic acid are placed in a vessel. To this are added 1971 parts of the binding agent dispersion I are added. The mixture is reacted with 775 parts of the pigment paste described. The solids of the varnish bath are adjusted with 229 parts deionized water. The varnish bath has the following characteristics:

Solids: 19.3% MEQ acid: 0.4200
pH value: 6.2 MEQ base: 0.602

The films deposited from this varnish bath at 25° C. during 2 minutes with 250 V are baked-on during 20 minutes at 185° C. The layer thickness of the baked-on layer is about 33 μm. The "wrap-around" according to BMW is about 90%.

Preparation of the Electro-Immersion Bath II 2000 parts deionized water and 25 parts 10% acetic acid are placed in a vessel. To this are added 2144 parts of the binding agent dispersion II. To the mixture are added 775 parts of the pigment paste described in the Example. The solids of the varnish bath are adjusted with 56 parts deionized water. The varnish bath has the following characteristics:

Solids: 18.9% MEQ acid: 0.532
pH-value: 6.5 MEQ base: 0.694

The films deposited from the varnish bath at 25° C. during 2 minutes are baked-on at 185° C. The layer thickness is about 38 μm. The films exhibit very good elasticity values.

EXAMPLE 3

Preparation of the Binding Agent III 1013 parts of a commercially available epoxy resin of the bisphenol A type (equivalent epoxy weight 188), 178 parts dimethylmalonic acid and 77 parts xylol are placed in a 4-liter reactor and heated to 133° C. At 125° C., 2.3 parts dimethylbenzylamine are added in the heating-up phase. The temperature is held at 133° C. until an equivalent epoxy weight of 420 is reached. Then, 433 parts polytetramethyleneglycol (OH number 174.5) and another 4 parts dimethylbenzylamine are added. The reaction is continued at the temperature indicated until an equivalent epoxy weight of 1150 is reached. Then, 179 parts of the 70% reaction product in methylisobutyl ketone of 2-di-2-aminoethylamine ethanol and methylisobutyl ketone and 249 parts of the 70% reaction product in methylisobutyl ketone of neopentanolamine and methyisobutyl ketone are added. The reaction preparation is held at 133° C. for another 3 hours, 165 parts propyleneglycolmonophenyl ether are added and rapid cooling to 95° C. takes place. Then, 906 parts of the cross-linking agent I are added and are mixed-in for 30 minutes.

In the meantime, a dispersing bath is prepared from 2120 parts deionized water, 38 parts glacial acetic acid and 51 parts of an emulsifier solution. It exhibits an acid number of 16.9. The above-described resin solution is dispersed therein and stirred after that for an hour. Then, another 2084 parts deionized water are added and mixed-in for 30 minutes. The dispersion is then filtered in a plate filter. The solids of the dispersion are about 34.5%.

Preparation of the Electro-Immersion Bath III

The electro-immersion varnish with the binding agent dispersion III is prepared according to the following prescription:
2218 parts deionized water
25 parts 10% acetic acid
1982 parts binding agent dispersion
775 parts pigment paste.

From this varnish bath, varnish films are deposited on phosphatized sheet steel at 25° C. for 2 minutes with 230 V. The films are rinsed off with deionized water and are baked-on for 2 minutes at 185° C. in a circulating-air drying cabinet. The layer thickness of the baked-on films is about 31 μm.

We claim:

1. A water dispersible binding agent for cationic electro-immersion varnishes based on modified epoxy resins, comprising the reaction product of:
   (A) an intermediate product consisting of a low molecular weight epoxy resin component A containing aromatic groups, with an equivalent epoxy weight of less than 375, completely reacted with at least one component B selected from the group consisting of aliphatic or alicyclic polyfunctional carboxylic acids, and aliphatic or alicyclic polyfunctional alcohols, said component B having a mean average molecular weight of less than 350 and being free from amine groups, wherein the intermediate product has a content of aromatic groups of 10% to 45%, calculated as phenylene groups,
   (B) said intermediate product being further reacted with a compound C selected from the group consisting of polyfunctional alcohols, polyfunctional carboxylic acids and polyfunctional SH-compounds, said component C having a mean average molecular weight of 500 to 5000 and being free from amine groups wherein a reaction product containing free epoxy groups is obtained, and
   (C) the product of the intermediate product and compound C being further and exclusively reacted with an amino alcohol at least one tertiary nitrogen atom or at least one blocked primary nitrogen atom to yield a reaction product containing basic amino groups.

2. The binding agent according to claim 1, wherein component A is an epoxy resin of the bisphenol A type.

3. The binding agent according to claim 1, wherein component A is a polyglycidyl ester.

4. The binding agent according to claim 1, 2 or 3, wherein the component B is a diol or a dicarboxylic acid with a branched aliphatic chain.

5. The binding agent according to claims 1, 2 or 3, wherein component B is a diol or a dicarboxylic acid with at least one neostructure.

6. The binding agent according to claim 1, wherein the molecular weight of component C is 530 to 3000.

7. The binding agent according to claim 1, wherein component C is a linear polyester polyol.

8. The binding agent according to claim 1, wherein component C is a linear polyether polyol.

9. The binding agent according to claim 1, wherein component C is a linear polyurethane with active hydrogens, a linear polyamide polyol or a linear dicarboxylic acid.

10. The binding agent according to claim 1, wherein component C is a polythio-ether polythiol.

11. The binding agent according to claim 1, wherein component C is 10 to 50% by weight, based on the entire binding agent.

12. The binding agent according to claim 1 wherein said amino alcohol is a primary amino alcohol blocked by the reaction of a primary amino with a ketone of the formula:

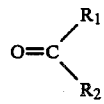

wherein $R_1$ and $R_2$ are alkyl radicals having 2 to 4 carbon atoms.

13. The binding agent according to claim 12 wherein said amino alcohol is selected from the group consisting of: ethanolamine, 2-(2-aminoethoxy)-ethanol, isopropanolamine, neopentyl amine, 2-aminobutanol.

14. The binding agent according to claim 1 wherein said amino alcohol of Component D includes a tertiary nitrogen atom.

15. The binding agent according to claim 14 wherein said amino alcohol is selected from the group consisting of: methyldiethanolamine; butyldiethanolamine; methyldiisopropanolamine; cyclohexyldiisopropanolamine, triethanolamine, triisopropanolamine, (N,N-methyl-hydryoxymethyl)propanediamine-1,3; N,N,N-2-aminoethyl-3-aminopropyl-2-hydroxyethylamine; N,N,N-di-2-aminoethyl-2-hydroxyethylamine.

16. The binding agent according to claim 1 wherein said amino alcohol is blocked by reaction therewith with a compound selected from the group consisting of: acetone, cyclohexanone, cyclopentanone and acetaphenone.

17. The binding agent according to claim 12 wherein said ketone is methylethylketone or methylisobutylketone.

18. A water dispersible binding agent for cationic electro-immersion varnishes based on modified epoxy resins, comprising the reaction product of:
   (A) an intermediate product consisting of a low molecular weight epoxy resin component A containing aromatic groups, with an equivalent epoxy weight of less than 375, completely reacted with at least one component B selected from the group consisting of aliphatic or alicyclic polyfunctional carboxylic acids, and aliphatic or alicyclic polyfunctional alcohols, said component B having a mean average molecular weight of less than 350, wherein the intermediate product has a content of aromatic groups of 10% to 45%, calculated as phenylene groups, (B) said intermediate product being further reacted with a compound C selected from the group consisting of polyfunctional alcohols, polyfunctional carboxylic acids and polyfunctional SH-compounds having a mean average molecular weight of 500 to 5000 wherein a reaction product containing free epoxy groups is obtained, and (C) the product of the intermediate product and compound C being further reacted with an amino alcohol having at least one tertiary nitrogen atom or a blocked primary nitrogen atom, with the proviso that said amino alcohol does not include an arylhydroxyl substituent to yield a reaction product containing basic amino groups.

19. The method for the preparation of water-dispersible binding agents for cationic electro-immersion varnishes comprising:

(A) reacting low molecular weight epoxy resins containing aromatic groups and having an equivalent epoxy weight of less than 375 with (B) at least one compound selected from the group consisting of aliphatic or alicyclic polyfunctional alcohols, and aliphatic or alicylic polyfunctional carboxylic acids, each having a mean average molecular weight of less than 350 and being free from amine groups, to produce reaction products consisting of said epoxy resins A adducted with said alcohols or carboxylic acids B and having a content of aromatic groups of 10 to 45%, calculated as a phenylene group, (C) further reacting the reaction product derived from steps A and B with polyfunctional alcohols, polyfunctional carboxylic acids or polyfunctional SH-compounds having a mean average molecular weight of 500 to 5000 and being free from amine groups wherein a reaction product containing free epoxy groups is obtained and (D) reacting the product of step C with amino alcohols containing at least one blocked primary or tertiary nitrogen atom to yield a reaction product containing basic amino groups which is dispersible in water.

* * * * *

UNITED STATES PATENT AND TRADEMARK OFFICE
CERTIFICATE OF CORRECTION

PATENT NO. : 4,724,254

DATED : February 9, 1988

INVENTOR(S) : Geist, et al.

It is certified that error appears in the above—identified patent and that said Letters Patent is hereby corrected as shown below:

Column 11, line 58, "alcohol at least" should read "alcohol containing at least".

Signed and Sealed this

Twenty-seventh Day of September, 1988

*Attest:*

DONALD J. QUIGG

*Attesting Officer*     *Commissioner of Patents and Trademarks*